United States Patent
Güzelarslan

(10) Patent No.: US 12,182,683 B2
(45) Date of Patent: Dec. 31, 2024

(54) SIGNAL AND/OR SPECTRUM ANALYZER DEVICE AND METHOD OF SIGNAL MATCHING

(71) Applicant: Rohde & Schwarz GmbH & Co. KG, Munich (DE)

(72) Inventor: Baris Güzelarslan, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1178 days.

(21) Appl. No.: 16/176,091

(22) Filed: Oct. 31, 2018

(65) Prior Publication Data
US 2020/0026983 A1 Jan. 23, 2020

(30) Foreign Application Priority Data
Jul. 19, 2018 (EP) .................................... 18184501

(51) Int. Cl.
*G06N 3/045* (2023.01)
*G06F 3/0482* (2013.01)
*G06N 3/088* (2023.01)

(52) U.S. Cl.
CPC ............. *G06N 3/045* (2023.01); *G06N 3/088* (2013.01); *G06F 3/0482* (2013.01); *G06F 2218/12* (2023.01)

(58) Field of Classification Search
CPC ........ G06N 3/0454; G06N 3/088; G06N 3/08; G06K 9/00536; G06F 3/0482; H04L 27/0012; H04B 1/16
See application file for complete search history.

(56) References Cited

U.S. PATENT DOCUMENTS

| 5,749,066 A * | 5/1998 | Nussbaum | G10L 15/16 704/243 |
|---|---|---|---|
| 7,966,277 B2 | 6/2011 | Adams | |
| 8,713,019 B2 | 4/2014 | Birdwell et al. | |
| 9,672,760 B1 * | 6/2017 | Breuer | H04L 9/3247 |
| 10,003,483 B1 * | 6/2018 | Migliori | H04L 27/0012 |
| 10,859,675 B2 * | 12/2020 | McMahon | A61B 5/1114 |
| 2017/0215806 A1 | 8/2017 | Bae et al. | |
| 2018/0129934 A1 | 5/2018 | Tao et al. | |
| 2019/0117978 A1 * | 4/2019 | Arcot Desai | A61N 1/0534 |
| 2020/0309930 A1 * | 10/2020 | Zhou | G01S 15/86 |

OTHER PUBLICATIONS

Lim, Hyungjun, et al. "Learning acoustic word embeddings with phonetically associated triplet network." arXiv preprint arXiv:1811.02736 (2018). (Year: 2018).*

(Continued)

*Primary Examiner* — Miranda M Huang
*Assistant Examiner* — Sidney Vincent Bostwick
(74) *Attorney, Agent, or Firm* — Westman, Champlin & Koehler, P.A.

(57) ABSTRACT

A signal matching apparatus comprising at least one receiving unit adapted to receive a signal; at least one memory unit adapted to store predefined reference data and at least one neural network configured to compare a signal profile of the received signal and/or signal parameters derived from the received signal with reference data stored in said memory unit to determine a similarity between the received signal and the predefined reference data.

14 Claims, 5 Drawing Sheets

(56) References Cited

OTHER PUBLICATIONS

Hoffer, Elad, and Nir Ailon. "Deep metric learning using triplet network." International workshop on similarity-based pattern recognition. Springer, Cham, 2015. (Year: 2015).*

Zeghidour, Neil, et al. "A deep scattering spectrum-deep siamese network pipeline for unsupervised acoustic modeling." 2016 IEEE International Conference on Acoustics, Speech and Signal Processing (ICASSP). IEEE, 2016. (Year: 2016).*

Becker, Suzanna. "Unsupervised learning procedures for neural networks." International Journal of Neural Systems 2.01n02 (1991):17-33. (Year: 1991).*

Kulin, Merima, et al. "End-to-end Learning from Spectrum Data: A Deep Learning approach for Wireless Signal Identification in Spectrum Monitoring applications." arXiv e-prints (2017): arXiv-1712. (Year: 2017).*

Yucel, Hikmet, et al. "Development of indoor positioning system with ultrasonic and infrared signals." 2012 International Symposium on Innovations in Intelligent Systems and Applications. IEEE, 2012. (Year: 2012).*

Signal analyzer. (2020). In Signal analyzer. Retrieved Oct. 31, 2023, from https://en.wikipedia.org/wiki/Signal_analyzer (Year: 2020).*

Extended European search report for European Patent Application No. 18184501.7, dated Jan. 14, 2019, search completed Jan. 3, 2019, 7 pages.

* cited by examiner

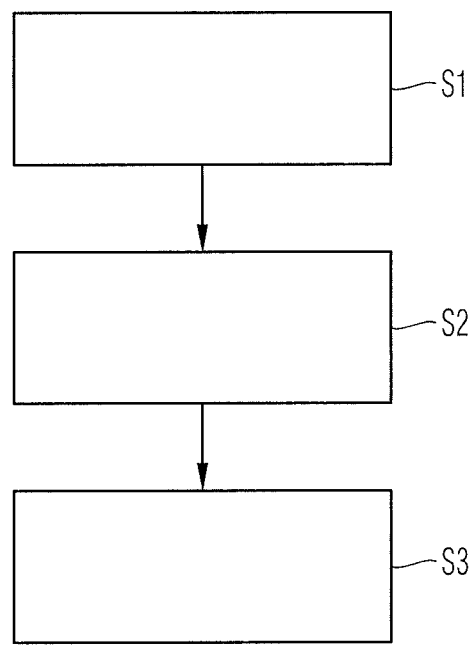

SIGNAL AND/OR SPECTRUM ANALYZER DEVICE AND METHOD OF SIGNAL MATCHING

CROSS-REFERENCE TO RELATED APPLICATION(S)

This application claims priority to European Patent Application No. 18184501.7, filed on Jul. 19, 2018, the content of which is hereby incorporated by reference in its entirety.

SUMMARY

The invention relates to a method and an apparatus for providing signal matching, in particular signal matching of RF signals.

BACKGROUND

A radio frequency (RF) signal provides for an oscillatory change in voltage or current in a circuit, waveguide or transmission line. The frequency range of a radio frequency signal can be from several thousand kilohertz to around 300 Gigahertz.

In many use cases, a user has recorded one or more signal profiles of interest as a reference signal profile and is interested to know whether a new received signal or another recorded signal does match with a pre-recorded reference signal. A traditional approach for matching is to first extract features and then to learn a similarity, for instance by using a L1-norm on the extracted features. A shortcoming of conventional learning-based methods is that the feature representation of the data and the metric are not learned jointly.

Accordingly, it is an object of the present invention to provide a method and an apparatus which perform matching of signals efficiently and to provide accurate matching results.

This object is achieved according to a first aspect of the present invention by a signal matching apparatus comprising the features of claim 1.

The invention provides according to the first aspect of the present invention a signal matching apparatus comprising
  at least one receiving unit adapted to receive a signal,
  at least one memory unit adapted to store predefined reference data and
  at least one neural network configured to compare a signal profile of the received signal and/or signal parameters derived from the received signal with reference data stored in said memory unit to determine a similarity between the received signal and the predefined reference data.

An advantage of the signal matching apparatus according to the present invention recites in that the neural network allows to jointly optimize the representation of the received data signal conditioned on a similarity measure being used and in particular provides for end-to-end learning.

In a preferred embodiment of the signal matching apparatus according to the present invention, the at least one receiving unit is adapted to receive an RF signal.

In a still further possible embodiment of the signal matching apparatus according to the first aspect of the present invention, the memory unit is adapted to store as reference data at least one data set representing one or more reference signals.

In a possible embodiment of the signal matching apparatus according to the first aspect of the present invention, the reference signal comprises a prerecorded reference signal received by at least one receiving unit of said signal matching apparatus and stored in its memory unit.

In a still further possible embodiment, the reference signal comprises a prerecorded reference signal loaded from a connected database into the memory unit of the signal matching apparatus.

In a further possible embodiment of the signal matching apparatus according to the first aspect of the present invention, the reference data stored in the memory unit comprises two- or three-dimensional representations of at least one reference signal in the time domain and/or in the frequency domain.

In a further possible embodiment of the signal matching apparatus according to the first aspect of the present invention, the reference data stored in the memory unit comprises as a representation of the reference signal a signal eye diagram, an IQ signal diagram, a waterfall spectrum and/or a spectrogram of the reference signal.

In a further possible embodiment of the signal matching apparatus according to the first aspect of the present invention, the signal matching apparatus further comprises a signal processing unit adapted to derive signal parameters of the received signal including a modulation scheme, a multiplexing scheme and/or a transmission scheme of the received signal.

In a still further possible embodiment of the signal matching apparatus according to the first aspect of the present invention, the neural network is adapted to provide a similarity metric indicating a similarity of the received signal with the predefined reference data.

In a further possible embodiment of the signal matching apparatus according to the first aspect of the present invention, the similarity metric comprises a binary similarity metric indicating whether the received signal does match the predefined reference data or not.

In a still further possible embodiment of the signal matching apparatus according to the first aspect of the present invention, a similarity metric comprises a real value similarity metric indicating an extent of matching between the received signal and the predefined reference data.

In a possible embodiment of the signal matching apparatus according to the first aspect of the present invention, the similarity metric provided by the neural network comprises a linear metric.

In a further possible embodiment of the signal matching apparatus according to the first aspect of the present invention, the similarity metric provided by the neural network comprises a non-linear metric.

In a still further possible embodiment of the signal matching apparatus according to the first aspect of the present invention, the similarity metric provided by the neural network comprises a local metric.

In a further possible embodiment of the signal matching apparatus according to the first aspect of the present invention, the neural network is formed by a siamese network comprising two identical subnetworks adapted to calculate feature vectors.

In a possible embodiment of the signal matching apparatus according to the first aspect of the present invention, the subnetworks of the siamese network comprise a first subnetwork and a second subnetwork, wherein the first subnetwork of the siamese network is adapted to process a signal profile of the received signal and/or parameters derived from the received signal to provide a first feature vector and wherein the second subnetwork of the siamese network is adapted to process the stored reference data to provide a second feature vector.

In a further possible embodiment of the signal matching apparatus according to the first aspect of the present invention, the siamese network further comprises a calculation unit adapted to calculate a similarity metric for the provided feature vectors indicating a similarity between the received signal and the predefined reference data.

In a still further possible embodiment of the signal matching apparatus according to the first aspect of the present invention, the neural network is a triplet network.

In a possible embodiment of the signal matching apparatus according to the first aspect of the present invention, the triplet network comprises three identical subnetworks adapted to calculate feature vectors.

In a further possible embodiment of the signal matching apparatus according to the first aspect of the present invention, the three identical subnetworks of the triplet network comprise a first subnetwork, a second subnetwork and a third subnetwork,
wherein the first subnetwork of the triplet network is adapted to provide a first feature vector for a first reference signal,
wherein the second subnetwork of the triplet network is adapted to provide a second feature vector for a second reference signal and
wherein a third subnetwork of the triplet network is adapted to provide a third feature vector of the received signal and/or parameter derived from the received signal.

In a still further possible embodiment of the signal matching apparatus according to the first aspect of the present invention, the triplet network further comprises two calculation units,
wherein a first calculation unit of the triplet network is adapted to calculate a first distance metric between the first feature vector and the third feature vector and
wherein a second calculation unit of the triplet network is adapted to calculate a second distance metric between the second feature vector and the third feature vector.

In a still further possible embodiment of the signal matching apparatus according to the first aspect of the present invention, the triplet network further comprises a comparator adapted to compare the first distance metric with the second distance metric to provide a similarity metric indicating a similarity between the received signal and the predefined reference data.

In a further possible embodiment of the signal matching apparatus according to the first aspect of the present invention, the subnetworks of the siamese network comprise deep neural networks, in particular convolutional neural networks.

In a further possible embodiment of the signal matching apparatus according to the first aspect of the present invention, the neural network is formed by a triplet network comprising three subnetworks adapted to calculate feature vectors.

In a further possible embodiment of the signal matching apparatus according to the first aspect of the present invention, the subnetworks of the triplet network comprise deep neural networks, in particular convolutional neural networks.

In a further possible embodiment of the signal matching apparatus according to the first aspect of the present invention, the deep neural networks are pretrained using auto encoders.

In a further possible embodiment of the signal matching apparatus according to the first aspect of the present invention, the reference data stored in the memory unit comprises precalculated fingerprints of reference signals.

The invention provides according to the second aspect a measurement device comprising a signal matching apparatus according to the first aspect and adapted to measure at least one signal, in particular RF signal, received by a receiving unit of said signal matching apparatus and further comprising a user interface adapted to indicate a determined similarity between the received signal and selectable reference data of reference signals to a user of said measurement device.

The invention provides according to the third aspect a signal matching method comprising the steps of:
providing predefined reference data,
receiving at least one signal, in particular at least one RF signal, and
comparing a signal profile of the received signal and/or signal parameters derived from the received signal by a neural network to determine a similarity between the received signal and the predefined reference data.

BRIEF DESCRIPTION OF FIGURES

In the following, possible embodiments of the different aspects of the present invention are described in more detail with reference to the enclosed figures.

FIG. 5 shows a flowchart of a possible exemplary embodiment of a signal matching method according to a further aspect of the present invention;

DETAILED DESCRIPTION OF THE EMBODIMENTS

Figure 1:
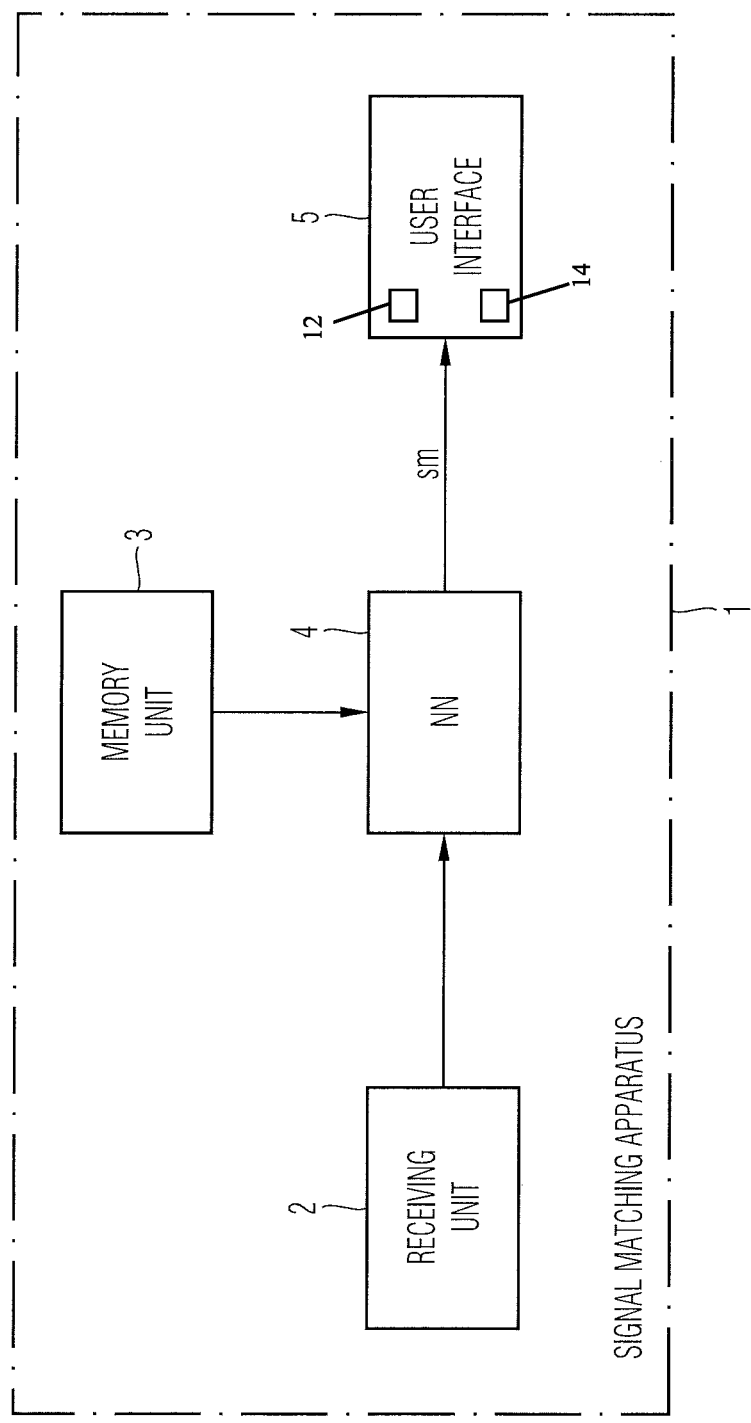
FIG. 1 shows a block diagram of a possible exemplary embodiment of a signal matching apparatus according to the first aspect of the present invention.

As can be seen in the block diagram of FIG. 1, a signal matching apparatus 1 according to an aspect of the present invention comprises at least one receiving unit 2 adapted to receive at least one signal, in particular at least one RF signal. The signal received by the receiving unit 2 can comprise a wireless or a signal received via a transmission line. The received signal can comprise an analogue or digital signal. The signal matching apparatus 1 further comprises at least one memory unit 3 adapted to store predefined reference data. The signal matching apparatus 1 further has at least one neural network 4 configured to compare a signal profile of the received signal and/or signal parameters derived from the received signal with the reference data stored in the memory unit 3 to determine a similarity between the received signal and the stored reference data. In a possible embodiment, the neural network 4 is adapted to provide a similarity metric sm indicating a similarity of the received signal and the predefined reference data stored in the memory unit 3. In a possible embodiment, the provided similarity metric sm can be supplied to a user interface 5 indicating a determined similarity between the received signal and the predefined reference data. In a possible embodiment, the signal matching apparatus 1 can be integrated in a measurement device. The measurement device or measurement equipment can be configured to measure signals, in particular RF signals applied to ports of the measurement device. The measurement device can for instance comprise a signal analyzer or spectrum analyzer. The measurement device can comprise a user interface adapted to indicate the determined similarity between the received signal and selectable reference data of reference signals to a user. In a possible embodiment, the user interface 5 can also be provided for selecting between different reference data in the memory unit 3 used by the neural network 5 to determine a similarity between the received signal and the selected reference data.

In a possible embodiment, the memory unit 3 of the signal matching apparatus 1 as illustrated in FIG. 1 is adapted to store as reference data at least one data set representing one or more reference signals. The reference signal can comprise a precorded reference signal received previously by at least one receiving unit 2 of the signal matching apparatus 1 and stored in the memory unit 3 in one or more representation forms as reference data. In a further possible embodiment, the prerecorded reference signal can be loaded from a connected database into the memory unit 3 of the signal matching apparatus 1. In a possible embodiment, the database can be connected to a data interface of a measurement device comprising the integrated signal matching apparatus 1. Prerecorded reference signals can then be loaded from the connected database via the interface into the memory unit 3 of the signal matching apparatus 1. In a possible embodiment, the prerecorded reference signals loaded from the database into the memory unit 3 can be selected in response to a selection signal input 14 by a user via the user interface 5 of the signal matching apparatus 1.

Figure 2:
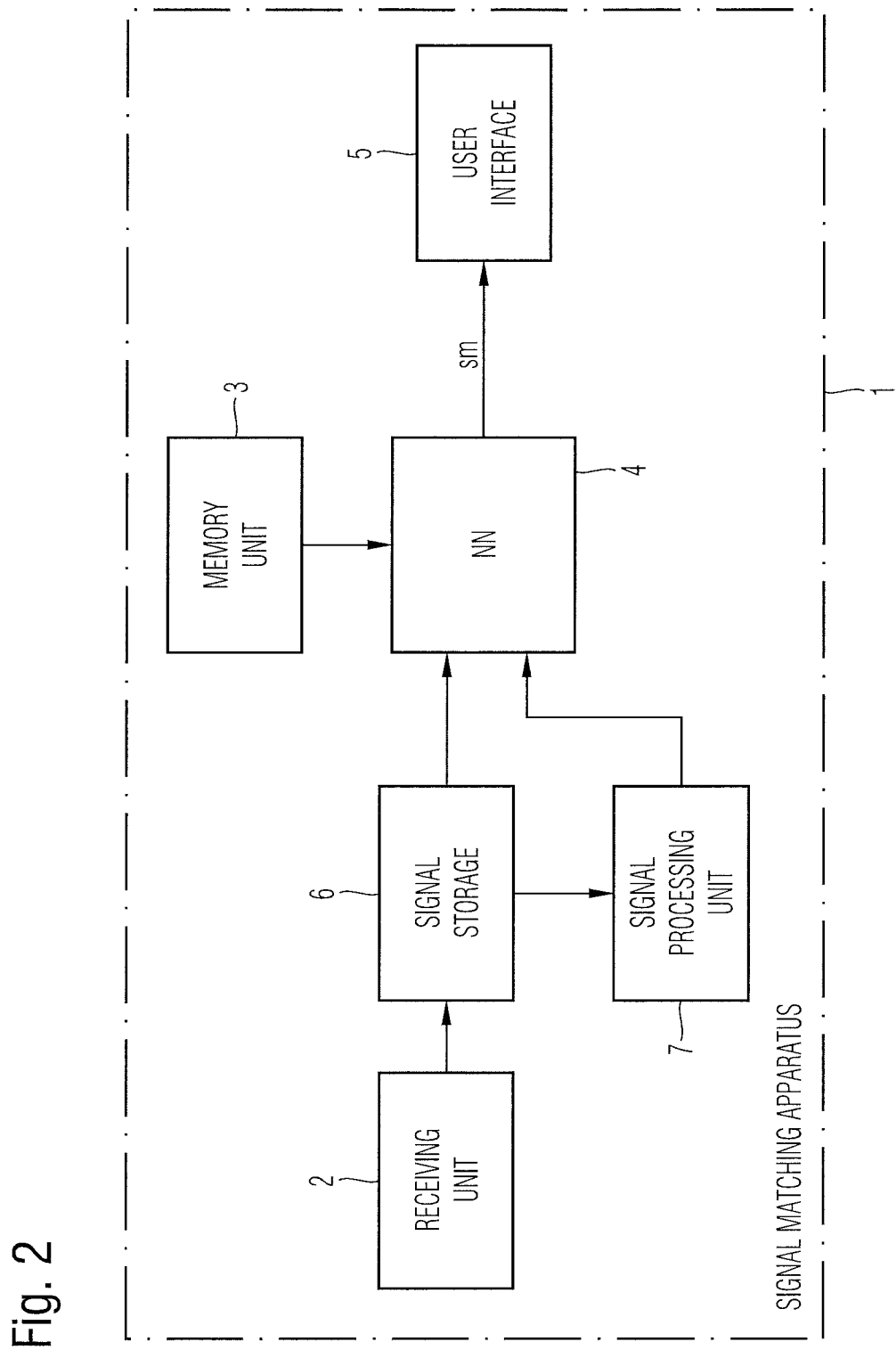
FIG. 2 shows a block diagram of a possible further exemplary embodiment of a signal matching apparatus according to the first aspect of the present invention.

In a possible embodiment of the signal matching apparatus 1, the reference data stored in the memory unit 3 can comprise a two- or three-dimensional representations of the at least one reference signal. These representations of the reference signal can be provided in the time domain and/or in the frequency domain. The memory unit 3 can be configured to hold a set of predefined data sets. The reference data stored in the memory unit 3 can comprise as a representation of the reference signal in a possible embodiment a signal eye diagram of the reference signal. In a further possible embodiment, the reference data stored in the memory unit 3 can comprise as a representation of the reference signal an IQ signal diagram of the reference signal. In a further possible embodiment of the signal matching apparatus 1, the reference data stored in the memory unit 3 can comprise as a representation of the reference signal a waterfall spectrum of the reference signal. In a further possible embodiment of the signal matching apparatus 1, the reference data stored in the memory unit 3 can comprise as a representation of the reference signal a spectrogram of the reference signal. Accordingly, different types of representations of the reference signal can be stored in the memory unit 3 of the signal matching apparatus 1. The representation can also include a level data, S/N or e.g. azimuth behaviour. In a possible embodiment, a user can select between different representation types of the reference signal which can be used for matching with the unknown received signal. For instance, a user can select between a signal eye diagram, an IQ signal diagram, a waterfall spectrum and/or any other kind of spectrogram stored in the memory unit 3 to be used by the neural network 4 for comparison with the received signal itself or with signal parameters of the received signal derived from the received signal, for instance by a signal processing unit 7 of the signal matching apparatus 1 as also illustrated in FIG. 2.

In a possible embodiment, a signal eye diagram, an IQ signal diagram, a waterfall spectrum and/or any other kind of spectrogram of a reference signal of interest can be loaded in advance from a database into the memory unit 3. After the reference data has been uploaded into the memory unit 3, the signal matching apparatus 1 within the measurement device can be activated for signal comparison to determine whether the received signal corresponds to the loaded reference signal.

In a possible embodiment, the selected representation of the reference signal can simultaneously be output via a user interface 5 of the signal matching apparatus 1. The user interface 5 can comprise a graphical user interface GUI having a display area 12 which can be adapted to display a selected signal eye diagram, a selected IQ signal diagram, a selected waterfall spectrum and/or a spectrogram of the reference signal. In a further possible embodiment of the signal matching apparatus 1 according to the present invention, the user interface 5 can also comprise a display area to output the representation of the received signal in a selected representation form including a signal eye diagram, an IQ signal diagram, a waterfall spectrum and/or a spectrogram of the reference signal. In a further possible embodiment, the user interface 5 comprises two display areas 12 where the selected representation of the reference signal and the selected representation of the received signal used for matching by the neural network 4 are displayed at the same time to the user along with a graphical representation of the determined similarity between the received signal and the reference signal. The similarity can further be expressed by a calculated similarity metric as a binary or numerical value. The neural network 4 is adapted to provide a similarity metric sm indicating the similarity between the received signal and the predefined reference data stored in the memory unit 3. The similarity metric sm can comprise in a possible embodiment a binary similarity metric indicating to the user whether the received signal does match the predefined reference data or reference signal or not. In a further possible embodiment, the calculated similarity metric sm can comprise a real value similarity metric indicating an extent of matching between the received signal and the predefined reference data, for instance a percentage value.

In a possible embodiment, the calculated similarity metric sm can also trigger an action performed by the measurement device. In a possible embodiment, the calculated similarity metric sm can be evaluated by a controller of the measurement device to generate one or more control signals depending on the evaluation result. For instance, if the similarity metric calculated by the neural network 4 indicates that the received signal does completely match a predefined specific reference signal whose reference data has been stored in the memory unit 3, the controller of the measurement device can generate a control signal triggering a specific measurement and/or control process.

In a possible embodiment, the similarity metric sm provided by the neural network 4 comprises a linear metric, such as Mahalanobis distance. A linear metric provides the advantage that it is easier to be optimized and less prone to overfitting. In a further possible embodiment of the signal matching apparatus 1 according to the first aspect of the present invention, the similarity metric sm provided by the neural network 4 can comprise a non-linear metric. Non-linear metrics such as histogram distances require to non-convex formulations and may overfit, however non-linear metrics have the advantage that they can capture non-linear variations in the data. In a still further possible embodiment, a similarity metric sm calculated by the neural network 4 comprises a local metric where multiple (linear or non-linear) local metrics are learned to deal with e.g. heterogeneous data.

In a possible embodiment, the neural network 4 of the signal matching apparatus 1 can be pretrained using an auto encoder. In a further possible embodiment of the signal matching apparatus 1 as illustrated in FIG. 1, the reference data stored in the memory unit 3 can comprise precalculated fingerprints of reference signals. The precalculated fingerprints can be used to reduce comparison time and computing resources including CPU and memory usage.

FIG. 2 shows a further possible exemplary embodiment of a signal matching apparatus 1 according to the first aspect of the present invention. In the illustrated exemplary embodiment, the signal received by the receiving unit 2 is stored in a signal storage 6 for further processing before being supplied to the neural network 4. The signal matching apparatus 1 comprises in the illustrated embodiment a signal processing unit 7 adapted to derive signal parameters from the received signal stored in the signal storage 6. The derived signal parameters can be supplied to the neural network 4 as shown in FIG. 2. The derived signal parameters generated by the signal processing unit 7 can comprise a variety of different parameters relating to the modulation scheme, the multiplexing scheme and/or the transmission scheme of the received signal. The parameters derived from the received signal can be used by the neural network 4 for performing the matching or comparison, in particular for a modulation scheme like QRM, AM, FM, a modulation scheme such as time frequency division multiplexing or code division multiplexing and/or a transmission scheme, in particular a transmission scheme of a network for transmission of the signal such as GSM, LTE, WLAN or WCDMA.

In a possible embodiment, the neural network 4 is adapted to compare the calculated representation of the received signal with a corresponding representation of a selected reference signal stored in the memory unit 3. The representation of the reference signal stored in the memory unit can include a number of different representations of the reference signal including a signal eye diagram, an IQ signal diagram, a waterfall spectrum and/or any other kind of spectrogram of the respective reference signal. One of these representations can be used to compare the received signal stored temporarily in the signal storage 6 with the predefined reference data set. In this embodiment, each different representation can provide a different signal comparing metric, i.e. a similarity metric sm output by the neural network 4.

For instance, reference data stored in the memory unit 3 may comprise as a representation of a reference signal a signal eye diagram, an IQ signal diagram and a waterfall spectrum of the respective reference signal. Each of these three representations can be applied to the neural network 4 and used by the neural network 4 for comparison with a corresponding presentation of the received signal. Accordingly, the received signal which can be stored in the signal storage 6 can be processed in a possible embodiment by the signal processing unit 7 to provide a signal eye diagram, an IQ signal diagram and a waterfall spectrum of the received signal. Then, the neural network 4 can compare the signal eye diagram of the received signal with the stored signal eye diagram of the reference signal. Further, the neural network 4 can compare the IQ signal diagram of the received signal with the IQ diagram of the stored reference signal. Finally, the neural network 4 can compare the calculated waterfall spectrum of the received signal with the predefined waterfall spectrum of the reference signal read from the memory unit 3. In this exemplary embodiment, the neural network 4 will calculate a first similarity metric sm1 indicating a similarity between the compared signal eye diagrams, a second similarity metric sm2 for the compared IQ signal diagrams and a third similarity metric sm3 indicating a similarity between the compared waterfall spectra. In a possible embodiment, the different similarity metrics sm1, sm2, sm3 provided by the neural network 4 for the different representation types can be supplied to a calculation unit which calculates according to a predefined aggregation rule a total similarity metrics sm from the received similarity metrics for the different representation types. For instance, a total similarity metric sm can be calculated as a function of the calculated similarity metrics sm1, sm2, sm3. In a simple implementation, a total similarity metric can be calculated as an average of the different similarity metrics calculated for the different representation types. In a possible embodiment, the different similarity metrics calculated for the different representation types can also be weighted depending on the reliability and robustness of the respective representation. For instance, the similarity metric sm provided by the comparison of the signal eye diagrams might be weighted higher than the similarity metrics sm provided by the comparison of the IQ signal diagrams.

Figure 3:
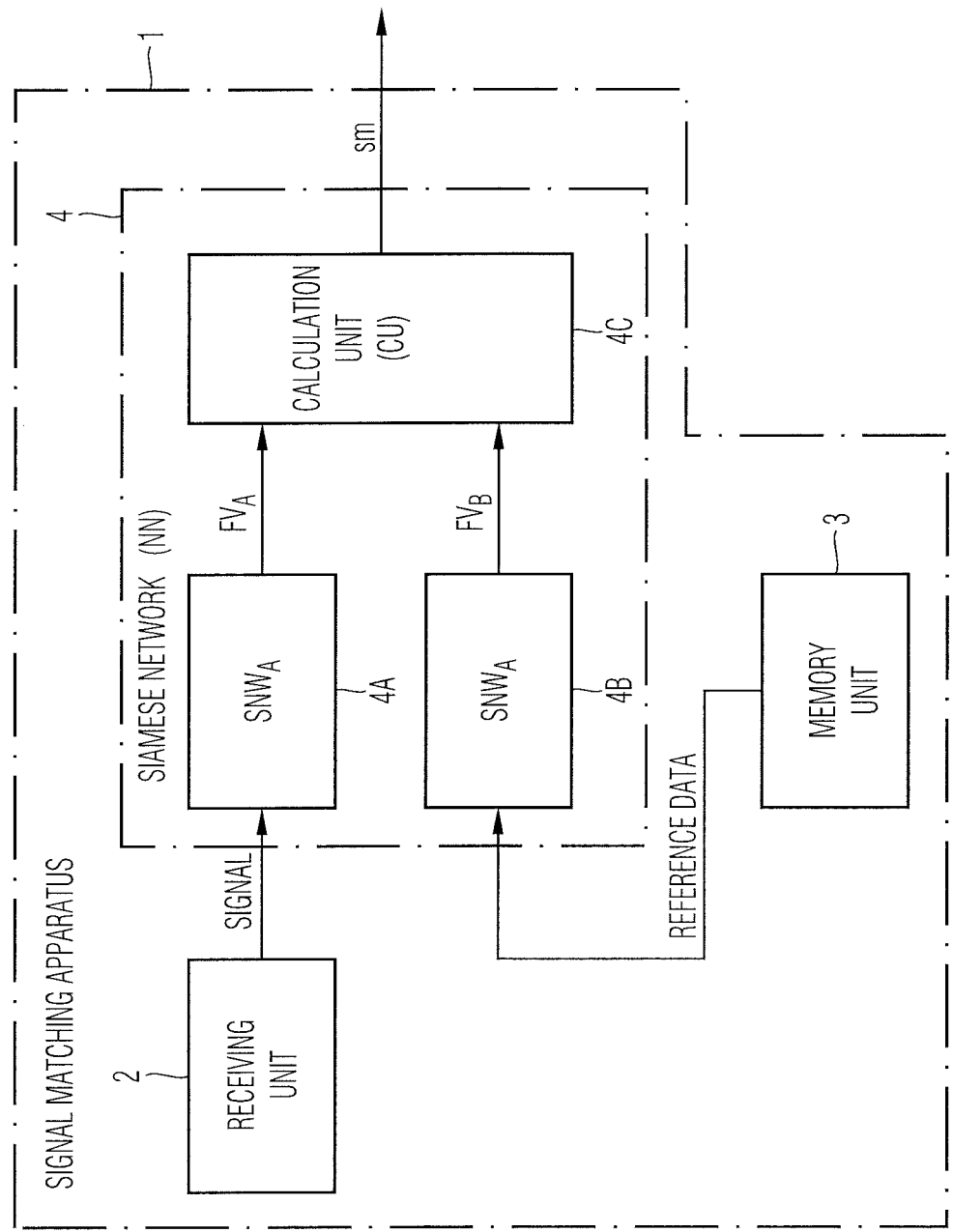
FIG. 3 shows a block diagram of a further possible exemplary embodiment of a signal matching apparatus according to the first aspect of the present invention.

FIG. 3 shows a block diagram of a further possible exemplary embodiment of a signal matching apparatus 1 according to the first aspect of the present invention.

In the illustrated embodiment of FIG. 3, the neural network 4 comprises a siamese network having two identical subnetworks 4A, 4B to calculate feature vectors $FV_A$, $FV_B$. The siamese network 4 further comprises in the illustrated embodiment a calculation unit 4C adapted to calculate a similarity metric sm for the provided feature vectors indicating a similarity between the received signal and the predefined reference data. As can be seen in the illustrated exemplary embodiment of FIG. 3, the first subnetwork 4A of the siamese network 4 is adapted to process a signal profile of the received signal and/or parameters derived from the received signal to provide or calculate a first feature vector $FV_A$. Further, in the illustrated embodiment, the second subnetwork 4B of the siamese network 4 is adapted to process the stored reference data read from the memory unit 3 to calculate a second feature vector $FV_B$. The feature vectors FV are used to represent numeric or symbolic characteristics or features of an object used by the calculation unit 4 for analyzing the similarity.

The subnetworks 4A, 4B of the siamese network 4 can comprise deep neural networks DNN, in particular convolutional neural network CNN. The convolutional neural network CNN is a feedforward artificial neural network having an input layer, an output layer as well as multiple hidden layers. The hidden layers of the convolutional neural network CNN can comprise convolutional layers, pooling layers, fully connected layers and normalization layers. The convolutional layers of the convolutional neural network CNN apply a convolution operation on the input passing the result to the next layer.

The siamese neural network 4 illustrated in FIG. 3 contains two identical subnetworks 4A, 4B. The subnetworks are identical because they have the same configuration with the same parameters and weights. Parameter updating is mirrored across both subnetworks 4A, 4B. The sharing of the weights across the subnetworks 4A, 4B has the advantage that fewer parameters have to be trained, which in turn means less data required and less intensity to overfit. Each subnetwork essentially produces a representation of its input, i.e. a feature vector FV.

Figure 4:
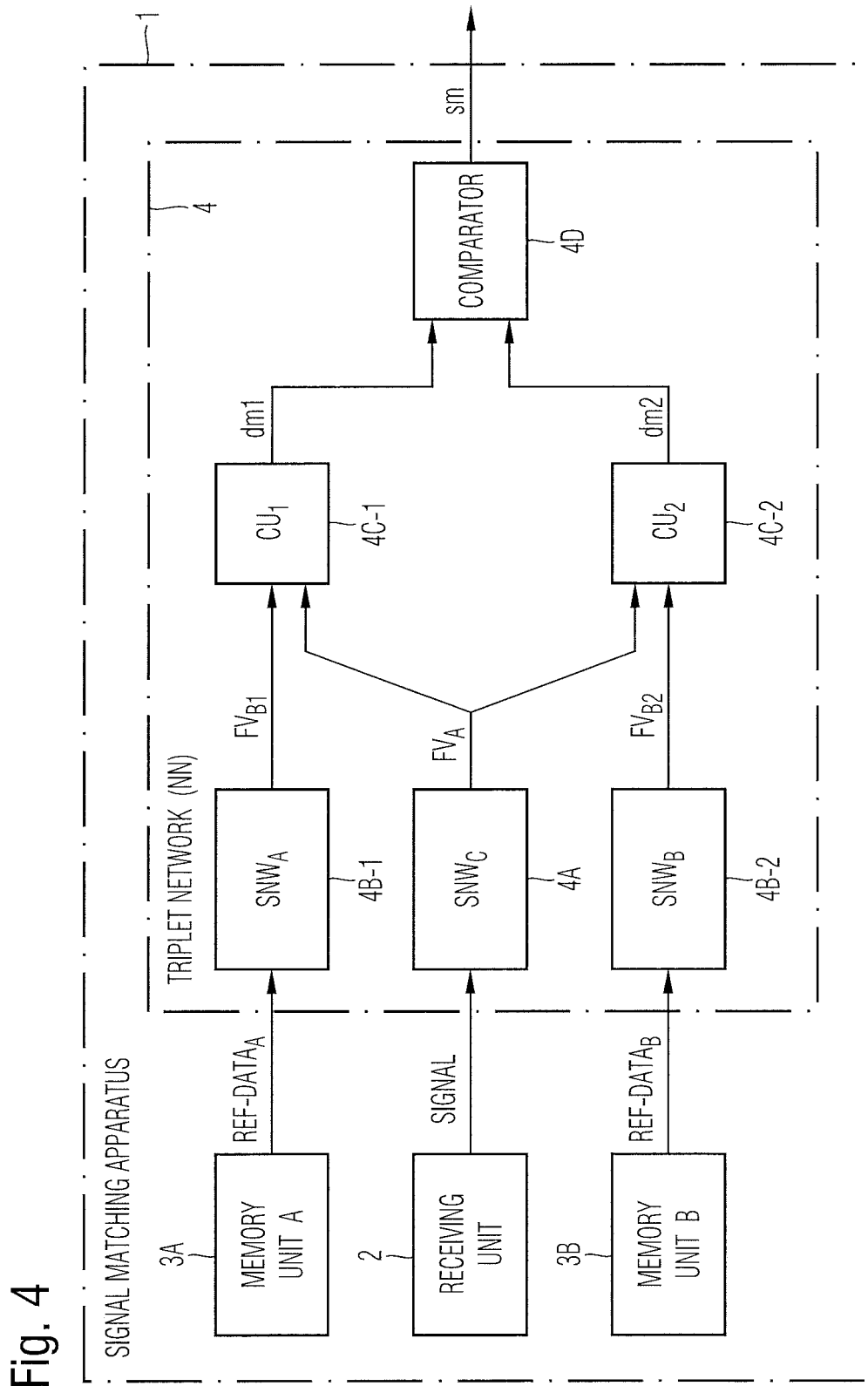
FIG. 4 shows a block diagram of a further possible exemplary embodiment of a signal matching apparatus according to the first aspect of the present invention.

FIG. 4 shows a block diagram of a further possible exemplary embodiment of a signal matching apparatus 1 according to the first aspect of the present invention. In the illustrated embodiment, the neural network 4 comprises a triplet network. The illustrated triplet network 4 comprises three identical subnetworks 4A, 4B-1, 4B-2 adapted to calculate feature vectors FV. The first subnetwork 4B-1 of the triplet network 4 is adapted to calculate a first feature vector $FV_B$-1 for a first reference signal or reference data read from a memory unit 3A. The second subnetwork 4B-2 of the triplet network 4 is adapted to provide a second feature vector $FV_B$-2 for a second reference signal or reference data read from a memory unit 3B. The third subnetwork 4A of the triplet network 4 is adapted to provide a third feature vector $FV_A$ of the received signal and/or of parameters derived from the received signal. The triplet network 4 comprises in the illustrated embodiment of FIG. 4 further two calculation units 4C-1, 4C-2. The first calculation unit 4C-1 of the triplet network 4 is adapted to calculate a first distance metric dm1 between the feature vector $FV_A$ of the received signal and the feature vector $FV_B$-1 of the first reference data as can be seen in FIG. 4. The other calculation unit 4C-2 of the triplet network 4 is adapted to calculate a second distance metric dm2 between the feature vector $FV_A$ of a received signal and the feature vector $FV_B$-2 of the second reference data as also shown in FIG. 4. The calculation units 4C-1, 4C-2 can in a possible embodiment calculate a L2 (Euclidean) distance between the applied feature vectors. The triplet network 4 further comprises a comparator 4D adapted to compare the first distance metric dm1 and the second distance metric dm2 to provide a similarity metric sm indicating a similarity between the received signal and the predefined reference data. The subnetworks of the triplet network 4 illustrated in FIG. 4 can comprise deep neural networks DNNs, in particular convolutional neural networks CNNs. The deep neural networks DNNs of the triplet network 4 can be pretrained using auto encoders.

Further, the reference data stored in the memory units 3A, 3B can comprise precalculated fingerprints of reference signals used by the triplet network 4 for feature extraction. The triplet network 4 can comprise three instances of the same feedforward neural network with shared parameters. Convolutional neural networks, CNNs, can jointly optimize the representation of the input data conditioned on the similarity metric or measure being used (end-to-end learning E2E).

The neural network 4 which can be formed by a siamese network as illustrated in the embodiment of FIG. 3 or by a triplet network as illustrated in the embodiment of FIG. 4 can be trained prior to use with labelled signal data. The subnetworks of the neural network 4 can comprise deep neural networks DNN pretrained using auto encoders. With the auto encoders, it is possible to perform unsupervised learning. The feature vectors FV generated by the trained subnetworks can be used for fingerprinting. In a possible embodiment, the generated fingerprints can be stored in a database. The auto encoders are suitable to calculate such fingerprints.

FIG. 5 shows a flowchart of a possible exemplary embodiment of a signal matching network according to a further aspect of the present invention. In the illustrated exemplary embodiment, the method comprises three main steps.

In a first step S1, predefined reference data is provided. In a possible embodiment, the reference data can be loaded from a memory unit 3 of the signal matching apparatus 1 or loaded from an external database.

In a further step S2, at least one signal, in particular at least one RF signal, is received by a receiving unit. The received radio frequency (RF) signal can comprise a frequency in a range between several kilohertz and about 300 Gigahertz.

In a further step S3, a signal profile of the received signal and/or signal parameters derived from the received signal are compared by a neural network 4 to determine a similarity between the received signal and the predefined reference data. In a possible embodiment, the neural network 4 calculates a similarity metric sm between the received signal and the predefined reference data including a binary similarity metric or a real value similarity metric. The metric is a function that quantifies a distance between elements thus providing a measure of similarity. The calculated similarity metric sm comprises a learnt metric. The learnt metric can comprise a linear learnt metric, a non-linear learnt metric and/or a local learnt metric. The calculated similarity metric sm can be further processed by a controller to trigger specific measurement and/or control processes. The method illustrated in the flowchart of FIG. 5 can be implemented on a controller of a measurement device such as a signal and/or spectrum analyzer.

In a possible embodiment the method according to the present invention can be used for signal profile matching, in particular transmitter matching.

The method can also be used to search for a specific signal within a sequence of signals, e.g. a pilot signal. In a possible embodiment the number of matches where the calculated similarity metric is higher than a threshold can be counted and evaluated (e.g. statistically evaluated) to analyse a signal transmission system and/or a signal transmission environment.

If the similarity determined in step S3 is sufficiently high a control signal can automatically be triggered to initiate a process performed internally by the measurement device and/or to initiate an external process or to generate an indication signal supplied by the measurement device to an entity of the respective signal transmission system.

The invention claimed is:

1. A signal and/or spectrum analyzer device, comprising at least one port for receiving an RF signal, a user interface having a display, and an integrated signal matching apparatus, the signal matching apparatus comprising:
    at least one RF receiver configured to receive the RF signal applied to the at least one port;
    at least one memory configured to store predefined reference data, wherein the reference data stored in the at least one memory comprises, as a representation type of a reference signal of the signal and/or spectrum analyzer device, at least two of:
  a signal eye diagram,
  an I/Q signal diagram,
  a spectrogram of the reference signal, and
  a waterfall spectrum of the reference signal,
    a signal processor comprising a signal or spectrum analyzer coupled to the RF receiver to generate signal parameters of the received signal, comprising:
  a signal eye diagram,
  an I/Q signal diagram,
  a spectrogram of the received signal, and/or
  a waterfall spectrum of the received signal, and
    at least one artificial neural network coupled to the signal processor and the at least one memory and trained to compare the signal parameters of the received signal generated by the signal processor with different types of the representation of the reference signal to determine a similarity between the received signal and the predefined reference data, wherein the user interface includes a selection signal input which receives an input from a user to select at least one of the stored representation types of the reference signal to instruct the artificial neural network to use the selected at least one representation type when performing the comparison, and further configured to visualize the determined similarity to a user, and wherein the at least one artificial neural network is coupled to the user interface to provide a similarity metric indicating the similarity of the received signal with the predefined reference data, wherein said similarity metric comprises:

a binary similarity metric indicating whether the received signal does match the predefined reference data or not; or a real value similarity metric indicating an extent of matching between the received signal and the predefined reference data;

wherein the similarity metric provided by the at least one neural network comprises one or more of a linear metric and/or a non-linear metric, wherein the at least one neural network is a siamese network comprising two identical subnetworks having a same configuration with same parameters and weights to calculate feature vectors, wherein a first subnetwork of the siamese network is trained to process a signal profile of the received signal and/or parameters derived from the received signal to provide a first feature vector, wherein a second subnetwork of the siamese network is trained to process the stored reference data to provide a second feature vector, wherein the at least one neural network is configured to calculate a similarity metric for the provided feature vectors indicating a similarity between the received signal and the predefined reference data having different types of representation.

2. The signal and/or spectrum analyzer device according to claim 1, wherein the at least one RF receiver is adapted to receive at least one RF signal.

3. The signal and/or spectrum analyzer device according to claim 1, wherein the at least one memory is adapted to store as reference data at least one data set representing the reference signal.

4. The signal and/or spectrum analyzer device according to claim 3, wherein the reference signal comprises a prerecorded reference signal received by at least one RF receiver of said signal matching apparatus and stored in at least one corresponding memory or a prerecorded reference signal loaded from a connected database into the at least one corresponding memory of said signal matching apparatus.

5. The signal and/or spectrum analyzer device according to claim 1, wherein the reference data stored in the at least one memory comprises two- or three-dimensional representations of at least one reference signal in the time domain and/or in the frequency domain.

6. The signal and/or spectrum analyzer device according to claim 1 further comprising a signal processor adapted to derive signal parameters of the received signal including modulation scheme parameters, multiplexing scheme parameters and/or a transmission scheme parameters of the received signal.

7. The signal and/or spectrum analyzer device according to claim 1, wherein the at least one neural network is a triplet network comprising three identical subnetworks trained to calculate feature vectors, wherein a subnetwork of the triplet network is trained to provide a first feature vector for reference data of a first reference signal, wherein a further subnetwork of the triplet network is trained to provide a second feature vector for reference data of a second reference signal and wherein a further subnetwork of the triplet network is trained to provide a third feature vector of the received signal and/or parameter derived from the received signal, said triplet network being trained to calculate a first distance metric between the first feature vector and the third feature vector and to calculate a second distance metric between the second feature vector, and the third feature vector, and wherein said triplet network is further trained to compare the first distance metric with the second distance metric to provide a similarity metric indicating a similarity between the received signal and the predefined reference data.

8. The signal and/or spectrum analyzer device according to claim 1, wherein the subnetworks of the siamese network or of a triplet network comprise deep neural networks, DNN, in particular convolutional neural networks, CNN.

9. The signal and/or spectrum analyzer device according to claim 8, wherein the deep neural networks, DNN, are pretrained using auto encoders.

10. The signal and/or spectrum analyzer device according to claim 1, wherein the reference data stored in the memory comprises precalculated fingerprints of reference signals.

11. A signal matching method performed by a signal and/or spectrum analyzer device comprising at least one port for receiving an RF signal, an integrated signal matching apparatus and a user interface having a display and a selection signal input which receives an input from a user to select, the method comprising the steps of:

(a) providing, by the signal matching apparatus, predefined reference data, wherein the reference data comprises, as a representation of a reference signal, at least two of:

a signal eye diagram, an I/Q signal diagram, a waterfall spectrum of the reference signal, and a spectrogram of the reference signal;

(b) receiving, by the signal and/or spectrum analyzer device, at least one RF signal with an RF receiver;

(c) processing the received RF signal with a signal or spectrum analyzer to determine signal parameters of the received RF signal comprising at least one of: a signal eye diagram, an I/Q signal diagram, a spectrogram of the received RF signal, and a waterfall spectrum of the received RF signal;

(d) comparing the signal parameters derived from the received RF signal with different types of the representation of the reference signal by a neural network to determine a similarity between the received signal and the predefined reference data; and (e) receiving from the selection signal input of the user interface an input to select at least one of a signal eye diagram, an I/Q signal diagram, a spectrogram and a waterfall spectrum for use by the neural network to perform the comparison;
(f) indicating, by the display area of the user interface, the similarity to a user,
wherein the neural network is configured to provide a similarity metric indicating a similarity of the received signal with the predefined reference data,
wherein said similarity metric comprises:
a binary similarity metric indicating whether the received signal does match the predefined reference data or not; or
a real value similarity metric indicating an extent of matching between the received signal and the predefined reference data;
wherein the similarity metric provided by the at least one neural network comprises
a linear metric, a non-linear metric and/or a local metric,
wherein the at least one neural network is a siamese network comprising two identical subnetworks having a same configuration with same parameters and weights to calculate feature vectors,
wherein a first subnetwork of the siamese network is trained to process a signal profile of the received signal and/or parameters derived from the received signal to provide a first feature vector,
wherein a second subnetwork of the siamese network is trained to process the stored reference data to provide a second feature vector,
wherein the at least one neural network is configured to calculate a similarity metric for the provided feature vectors indicating a similarity between the received signal and the predefined reference data having different types of representation.

12. The signal matching apparatus according to claim 7, wherein the subnetworks of a siamese network or of the triplet network comprise deep neural networks, DNN, in particular convolutional neural networks, CNN.

13. The signal and/or spectrum analyzer according to claim 1 wherein the user interface is further configured to provide a control signal output to trigger a specific measure and/or control a process when the similarity metric provided by the neural network indicates that the received signal and the predefined reference data completely match.

14. The signal method according to claim 11 including providing a control signal output to trigger a specific measure and/or control a process when the similarity metric provided by the neural network indicates that the received signal and the predefined reference data completely match.

* * * * *